A. J. REYNOLDS.
FRUIT-DRIER.
No. 172,172.
Patented Jan. 11, 1876.
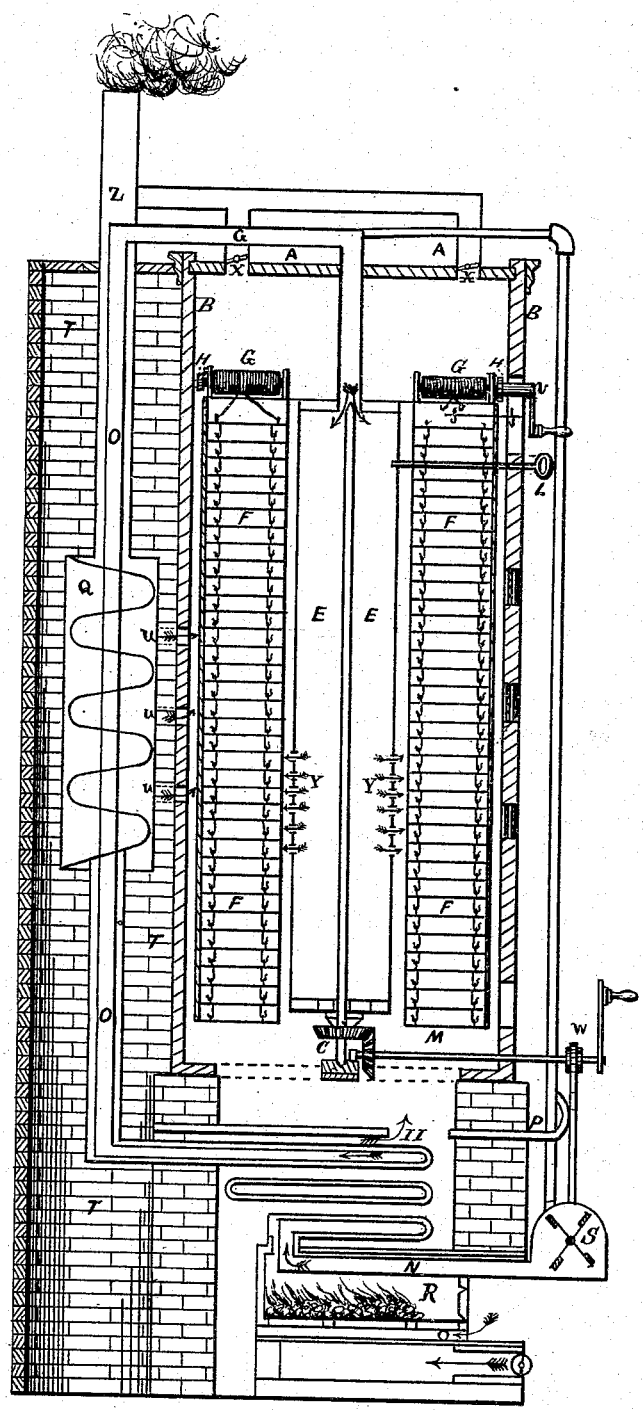
Witnesses
Chas. P. Webster
B. C. Webster
Inventor.
Andrew Jackson Reynolds.

UNITED STATES PATENT OFFICE.

ANDREW JACKSON REYNOLDS, OF CHICAGO, ILLINOIS.

IMPROVEMENT IN FRUIT-DRIERS.

Specification forming part of Letters Patent No. 172,172, dated January 11, 1876; application filed October 19, 1875.

*To all whom it may concern:*

Be it known that I, ANDREW JACKSON REYNOLDS, of Chicago, in the county of Cook and State of Illinois, have invented certain new and useful Improvements in Fruit - Driers or Evaporators; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The nature of this invention relates to certain improvements in the construction and operation of an improved apparatus for curing fruits, vegetables, meats, and other articles which it is desired to preserve in a fresh and unpickled state; and its object is to provide an apparatus that will be cheap, simple, and effective in its operation, as will be hereinafter more fully set forth.

The accompanying drawing is a sectional elevation of my fruit-drier.

B represents the outer case or dry-house, provided at one side under its bottom with a furnace, R, to give heat to the fruit within the dry-house. Near the bottom of the case B are openings I I, provided with a slide, P, for admitting or shutting off hot and cold air, as required. In the top of the dry-house is a valve, X, for the escape of damp air, &c.

E is a shaft and drum passing vertically through the center of the drier, and to said shaft, within the drier, a suitable distance below the top, are attached horizontal rollers and cranks G G, from which are suspended racks F F, containing the fruit or other articles to be dried.

On the lower end of the shaft and drum E is a gear-wheel, meshing with a similar wheel on a horizontal shaft and crank, W, which may be rotated by means of weights or the crank, as shown in the drawing, or by other suitable means, so as to impart a rotating motion to the hollow drum E, with its racks suspended therefrom. It will be thus seen that the screens F revolve around the dry-house, whereby a perfect circulation of air is created in all parts of the evaporator alike, aided very much by the heated-air pipe O and fans S. The pipe O passes directly through the furnace and up inside of the smoke stack or pipe to the top of the dry-house, thence down the center of the house to the top of the drum E, supplying all necessary heated air to the center of the dry-house through the ports Y Y by means of the fans S, which may be operated by a belt from crank W, as shown; and the heat is also greatly economized and perfectly equalized by the use of my hot-air flue T T, which is so constructed as to inclose the smoke-stack and drum Q to the top of the dry-house, thus retaining the heat from both, which is admitted to the fruit through the ports U U on the side of the dry-house about half-way from the furnace to the top of drum. This enables me to dry all kinds of fruits and vegetables the same at the center and top of the dry-house as at the bottom near the furnace.

The operation is as follows: The windlass or rollers G G and ratchets H H are reversed, so as to let the rope or cord reach the lower door near the bottom of the dry-house, and the fruit screens or trays are inserted as quickly as prepared, and attached to the rope and windlass by the hooks, and moved, after twenty minutes, high enough to admit the next tray of fruit, and so on until they reach the top of the drum, and are perfectly cured or dried. The crank is so constructed as to be detachable at will, and allow the drum to rotate.

This drier or evaporator is simple in construction, not liable to get out of order, and the heat can be easily regulated. The fruit will be dried in a thorough manner without losing any of its flavor in less than three hours. Any desired quality of dried products may be produced in any common room, or out of doors, without sweating or steaming the fruits, which destroys the natural flavor and consistency of the products, and without building very high expensive buildings or towers, as is now often done, where the fruit is placed over a furnace and raised to a considerable altitude, which is necessary to produce a product proof against decay or change, enhanced in ripeness, sweetness, and characterized by its natural color, and which can not be injured, as dried substances are apt to be, by moisture of damp weather, or damp places or climates, or being reduced in a dry atmosphere to a parched and brittle consistency.

I would also state that, by this process of evaporation and condensation, new potatoes and green corn (in the ear or otherwise) may be so preserved (dried) as to retain all their original flavor, so rapidly and economically that they may be had in all large cities and foreign markets as cheap as the original products in their natural state, thus avoiding all possibility of decay from frosts or other causes.

Having thus fully described my invention, what I claim as new, and desire to secure by Letters Patent, is—

1. In a fruit-drying apparatus, substantially as described, a drum rotating within a drying-chamber, and carrying with it, in its rotation, a series of fruit-shelves, vertically reciprocating by means of windlasses, substantially as and for the purposes set forth.

2. The drum E, extending centrally through the dry-house B B, supporting the fruit-trays F, windlass G, and ratchets H, constructed and combined to operate substantially as and for the purposes herein set forth.

3. The hot-air pipe O, in combination with the hollow shaft and furnace R, fan S, smoke-stack Z, and drum E, for the use and purposes as described.

4. The hot-air drum Q, heated-air pipe O, warm-air chamber T, ports U, in combination with the rotating drum E and fruit-trays F, for the purposes as described.

In testimony that I claim the foregoing as my own I affix my signature in presence of two witnesses.

ANDREW JACKSON REYNOLDS.

Witnesses:
   CHAS. P. WEBSTER,
   B. C. WEBSTER.